United States Patent
Shimada et al.

[11] Patent Number: 5,897,687
[45] Date of Patent: *Apr. 27, 1999

[54] AMMONIA ADSORPTION APPARATUS

[75] Inventors: Teruko Shimada; Toshiyuki Onishi; Satoru Serizawa; Atsushi Morii; Osamu Naito; Shigeyuki Nishijima, all of Nagasaki, Japan

[73] Assignee: Mitsubishi Jukogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/546,102

[22] Filed: Oct. 20, 1995

[30] Foreign Application Priority Data

Oct. 20, 1994 [JP] Japan .................................. 6-255081

[51] Int. Cl.$^6$ ...................................................... B01D 53/02
[52] U.S. Cl. ............................... 95/128; 96/130; 423/237; 422/169; 422/171; 422/172; 422/178
[58] Field of Search ....................................... 422/168–172, 422/178; 423/235, 237; 95/93, 128; 96/145, 130

[56] References Cited

U.S. PATENT DOCUMENTS 5,435,981   7/1995   Ichiki et al. ........................ 423/239.1

FOREIGN PATENT DOCUMENTS

| 0 590 744 | 4/1994 | European Pat. Off. . |
| 0 604 198 | 6/1994 | European Pat. Off. . |
| 3 807 111 | 9/1989 | Germany . |
| 53125962 | 2/1978 | Japan . |
| 5523069 | 2/1980 | Japan . |

*Primary Examiner*—Hien Tran
*Attorney, Agent, or Firm*—Foley & Lardner

[57] ABSTRACT

Disclosed is an ammonia adsorption apparatus for removing ammonia contained in a treated gas discharged from a denitrator for decomposing nitrogen oxides present in exhaust gas using ammonia as a reducing agent, comprising at least two adsorption towers into which ammonia-containing exhaust gas is introduced in a vertical direction for removing the ammonia by adsorption, wherein, during regeneration of each adsorption tower, hot gas used for desorption purposes flows from a top toward a bottom of the adsorption tower and cooling gas flows from the bottom toward the top of the adsorption tower.

8 Claims, 4 Drawing Sheets

HOT GAS INLET

HOT GAS INLET
DESORPTION GAS OUTLET
ADSORBENT BED

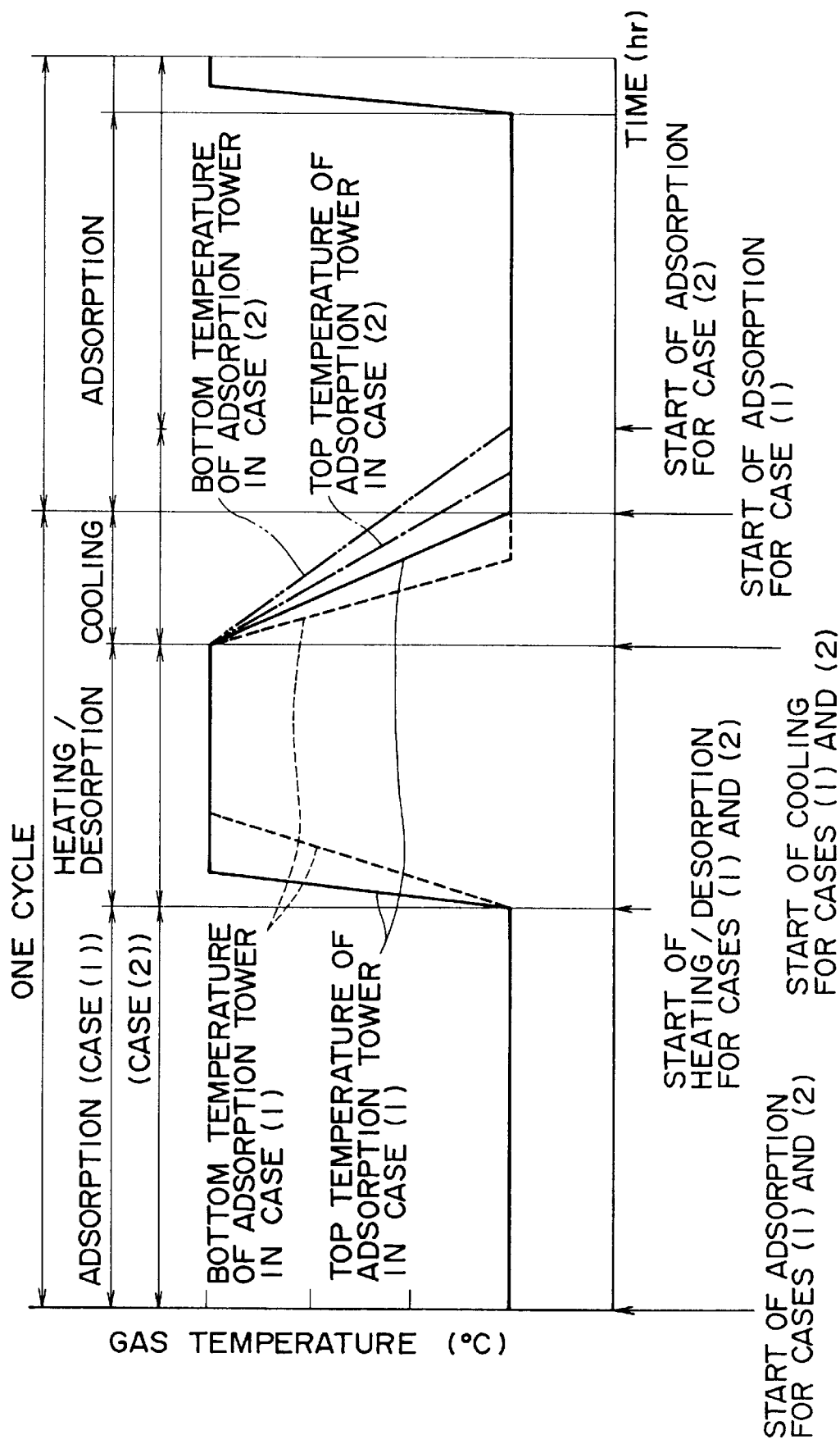

AMMONIA ADSORPTION APPARATUS

BACKGROUND OF THE INVENTION

1. Field of the Invention

This invention relates to ammonia adsorption apparatus to be disposed downstream in the flow of exhaust gas from a denitrator which removes nitrogen oxides present in exhaust gas using ammonia as a reducing agent.

2. Description of the Related Art

FIG. 4 is a flow diagram illustrating a $NO_x$ removal system provided with conventional ammonia adsorption apparatus. In this conventional system, exhaust gas emerging from a gas turbine 1 is conducted through a flue and introduced into a waste heat recovery boiler 2, where it is mixed with ammonia injected by an ammonia injector 3 installed therein. The resulting mixture is then introduced into a denitrator 4 installed downstream, where nitrogen oxides ($NO_x$) present in the exhaust gas are decomposed into innoxious nitrogen and water. Subsequently, the exhaust gas is introduced into one of two horizontal adsorption towers 5 and 5 disposed in parallel by way of the corresponding exhaust gas duct 7A or 7B, and freed of any residual ammonia by adsorption. Thereafter, the exhaust gas is conducted through an exhaust gas duct 8 and discharged from a stack 6 into the atmosphere. Although each adsorption tower 5 is packed with an ammonia adsorbent, further adsorption cannot be effected after a certain amount of ammonia has been adsorbed. Accordingly, the dampers for adsorption tower 5 are adjusted so that desorption gas comprising a portion of the hot exhaust gas emerging from gas turbine 1 is conducted through a desorption gas duct 9 and introduced into adsorption tower 5 in order to raise the temperature of the ammonia adsorbent and desorb ammonia therefrom. Thereafter, the desorption gas is discharged from stack 6.

After ammonia has been fully desorbed from one adsorption tower 5, this adsorption tower 5 is cooled in preparation for the next adsorption step. This can be accomplished by supplying cold gas to adsorption tower 5 through a cooling gas duct (not shown) and making it flow from the top to the bottom thereof, or by blowing air into the top of adsorption tower 5 by means of a fan (not shown). The above-described steps are repeatedly performed in each adsorption tower. In FIG. 4, while one adsorption tower 5 is engaged in the adsorption step, the other adsorption tower 5 is engaged in the desorption step. Thus, these steps are alternately and repeatedly performed in the two adsorption towers 5 and 5.

Where the adsorption towers are of the horizontal type as seen in the above-described conventional ammonia adsorption apparatus, the desorption of ammonia is effected by using hot exhaust gas for heating purposes in a volume equal to 1/50 of that of the main exhaust gas and passing it through an adsorption tower in the same direction as for the adsorption of ammonia. However, the small volume of gas tends to cause channeling and fails to raise the temperature of the adsorption tower uniformly. Accordingly, the ammonia adsorbed on the adsorbent cannot be fully desorbed within the heating/desorption period, resulting in a decrease in the amount of ammonia adsorbed in the next adsorption step. Moreover, since cooling is effected by making cold gas flow from the top to the bottom of the adsorption tower, the cold gas passes through the adsorption tower locally. Thus, the adsorption tower is not cooled uniformly as a whole and requires a long cooling time. For these reasons, the operation of this apparatus involves various problems including readjustment of the adsorption/desorption time schedule, reconsideration of the number of adsorption towers, and complication of the adsorption/desorption control.

SUMMARY OF THE INVENTION

It is an object of the present invention to provide ammonia adsorption apparatus which can solve the above-described problems encountered in the conventional ammonia adsorption apparatus.

According to the present invention, there is provided ammonia adsorption apparatus to be installed downstream of a denitrator for decomposing nitrogen oxides present in exhaust gas by using ammonia as a reducing agent, characterized in that said ammonia adsorption apparatus includes at least two adsorption towers into which ammonia-containing exhaust gas is introduced in a vertical direction for the purpose of removing the ammonia by adsorption and in that, during regeneration of each adsorption tower, hot gas used for desorption purposes is made to flow from the top toward the bottom of the adsorption tower and cooling gas is made to flow from the bottom toward the top of the adsorption tower.

After ammonia has been fully adsorbed in an adsorption tower during the adsorption period, hot gas used for desorption purposes is supplied to the adsorption tower (usually in a volume equal to 1/50 of that of the main exhaust gas) and made to flow from the top toward the bottom thereof. Thus, in spite of its small differential pressure, the gas flows through the adsorbent bed and forms layered flow paths among the absorbent layers, and thus it raises the temperature of the adsorption tower uniformly, allowing the desorption of ammonia to proceed smoothly. Moreover, since cold cooling gas is made to flow from the bottom toward the top of the adsorption tower, this cooling gas passes through the whole of the adsorption tower, making it possible to cool the entire adsorption tower in a short period of time. Thus, adsorption/desorption cycles can be performed smoothly and their control can be simplified.

The present invention can achieve the following advantageous results.

(1) Since vertical adsorption towers are employed and hot desorption gas flows from the top toward the bottom of each adsorption tower, even a small volume of gas can raise the temperature of the adsorption tower sufficiently. Moreover, since the gas descends through the adsorption tower while forming a gas layer, ammonia can be desorbed uniformly and the desorption of ammonia can be completed in a short period of time.

(2) Since cooling gas flows from the bottom toward the top of the adsorption tower, the cooling gas ascends through the adsorption tower without causing channeling. Thus, the cooling step can be completed in a short period of time.

(3) Since the desorption/cooling step has a good margin as described above, the adsorption/desorption cycles are stabilized. Moreover, this adsorption/desorption system can be designed to have a dual construction capable of achieving the highest operating efficiency, and can hence be efficiently operated by using a small amount of catalyst and a small number of adsorption towers.

BRIEF DESCRIPTION OF THE DRAWINGS

FIG. 3 is a schematic diagram showing the changes with time of the top and bottom temperatures of an ammonia adsorption tower.

DETAILED DESCRIPTION OF THE PREFERRED EMBODIMENT

Figure 1:
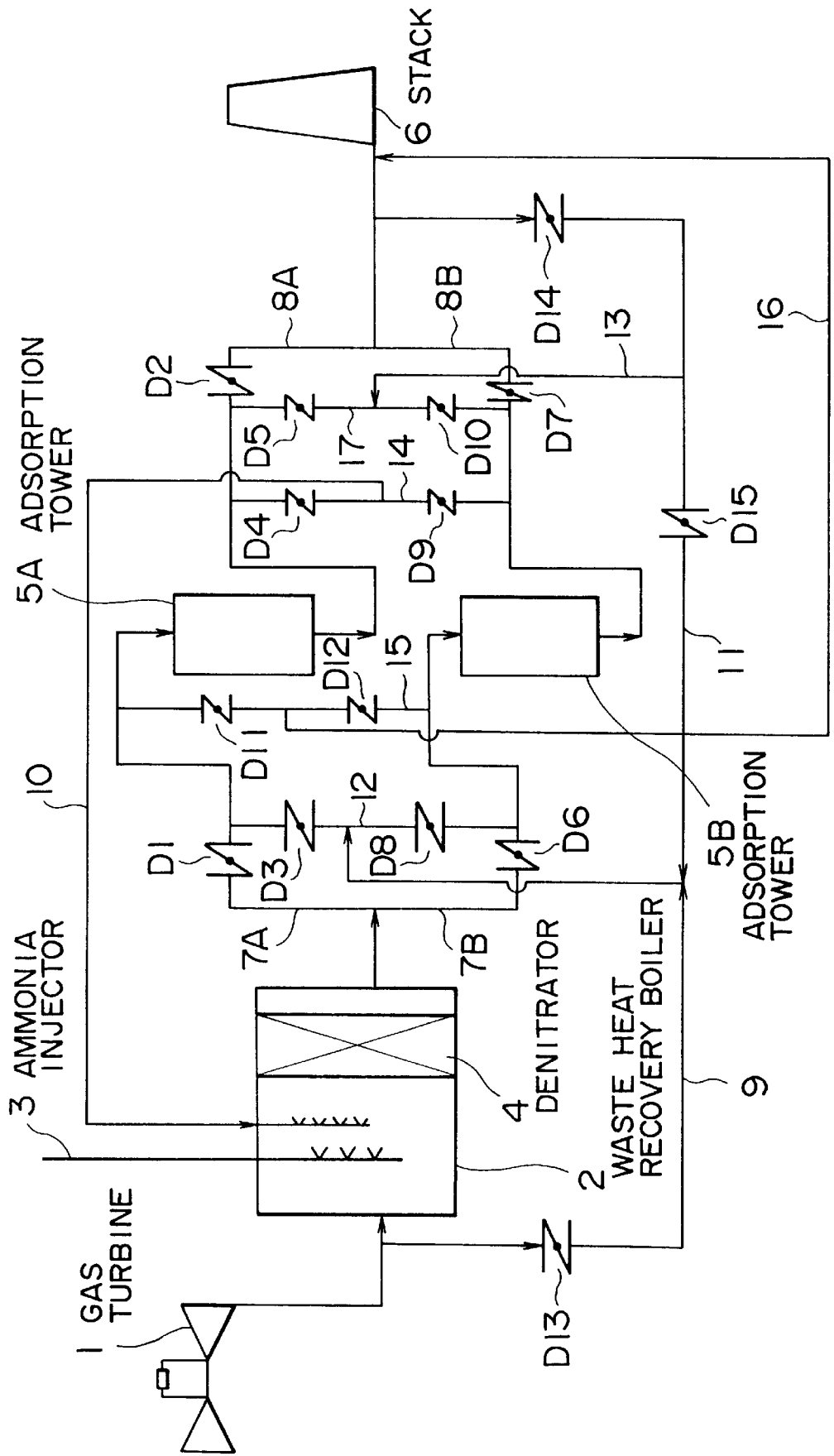
FIG. 1 is a flow diagram illustrating one embodiment of the present invention.

One embodiment of the present invention is described with reference to FIG. 1. In FIG. 1, numeral 1 designates a gas turbine. Exhaust gas from gas turbine 1 is introduced into a waste heat recovery boiler 2. An ammonia injector 3 is installed within waste heat recovery boiler 2. A denitrator 4 is installed downstream of ammonia injector 3. Two adsorption towers 5A and 5B are disposed in parallel on the downstream side of denitrator 4 and packed with an ammonia adsorbent. A stack 6 is installed downstream of adsorption towers 5A and 5B. The adsorption towers 5A and 5B are of the vertical type and, as will be described later, ammonia-containing exhaust gas flows through adsorption towers 5A and 5B as a vertical, downward stream.

Two branched exhaust gas ducts 7A and 7B for conveying the exhaust gas leaving denitrator 4 are connected to the tops of adsorption towers 5A and 5B, respectively. These exhaust gas ducts 7A and 7B are provided with dampers $D_1$ and $D_6$, respectively. The bottoms of adsorption towers 5A and 5B are connected to a stack 6 by exhaust gas ducts 8A and 8B having dampers $D_2$ and $D_7$, respectively.

A duct 12 connects the downstream side of damper $D_1$ of the aforesaid exhaust gas duct 7A to the downstream side of damper $D_6$ of the aforesaid exhaust gas duct 7B, and is provided with dampers $D_3$ and $D_8$. A desorption gas duct 9 for allowing a portion of the exhaust gas from gas turbine 1 to diverge from a point between gas turbine 1 and waste heat recovery boiler 2 is provided with a damper $D_{13}$. Moreover, a duct 11 for allowing a portion of the exhaust gas to diverge from the upstream side of stack 6 is provided with dampers $D_{14}$ and $D_{15}$. These ducts 9 and 11 are combined with each other and then connected to the aforesaid duct 12 between dampers $D_3$ and $D_8$. Thus, the flow rates of the exhaust gases in ducts 9 and 11 are controlled by dampers $D_{13}$ and $D_{15}$ so as to obtain a predetermined temperature and the resulting gas mixture is supplied to duct 12.

The upstream side of damper $D_2$ of the aforesaid exhaust gas duct 8A and the upstream side of damper $D_7$ of the aforesaid exhaust gas duct 8B are connected by a duct 14 having dampers $D_4$ and $D_9$. A duct 10 branches from this duct 14 between dampers $D_4$ and $D_9$ and is connected to waste heat recovery boiler 2 between ammonia injector 3 and denitrator 4.

The downstream side of damper $D_1$ of the aforesaid duct 7A and the downstream side of damper D of the aforesaid duct 7B are connected by a duct 15 having dampers $D_{11}$ and $D_{12}$. A duct 16 branches from this duct 15 at a point between dampers $D_{11}$ and $D_{12}$ and is connected to stack 6. Moreover, the upstream side of damper $D_2$ of the aforesaid duct 8A and the upstream side of damper $D_7$ of the aforesaid duct 8B are connected by a duct 17 having dampers $D_5$ and $D_{10}$, and a cooling gas duct 13 branching from the aforesaid duct 11 at a point between dampers $D_{15}$ and $D_{14}$ is connected to this duct 17 between dampers $D_5$ and $D_{10}$.

In this embodiment, $NO_x$-containing hot exhaust gas emerging from gas turbine 1 is introduced into waste heat recovery boiler 2 installed downstream thereof, where it is cooled by heat exchange in a heat exchanger (not shown) and mixed with ammonia injected by ammonia injector 3.

The resulting mixture is then introduced into denitrator 4, where the $NO_x$ is decomposed into innoxious nitrogen and water In this process, ammonia is injected in an amount in excess of that required to react with the $NO_x$ so that a high degree of denitration may be achieved. Accordingly, residual ammonia which has not been used for reaction in denitrator 4 remains in the exhaust gas leaving denitrator 4.

By opening dampers $D_1$ and $D_2$ associated with one adsorption tower 5A, the above-described exhaust gas containing ammonia injected in excess by ammonia injector 3 is introduced into the top of adsorption tower 5A installed downstream of denitrator 4.

Thus, the ammonia-containing exhaust gas introduced into one adsorption tower 5A flows through adsorption tower 5A as a vertical, downward stream, and ammonia present in the exhaust gas is adsorbed by the adsorbent packed in adsorption tower 5A. Thereafter, the exhaust gas is conducted through exhaust gas duct 8A and discharged from stack 6 into the atmosphere.

During this period, dampers $D_{13}$, $D_{14}$ and $D_{15}$ are opened, so that a portion of the hot exhaust gas from gas turbine 1 is mixed with a portion of the cold exhaust gas entering stack 6. The resulting gas mixture, which is used as a desorption gas, is conducted through open damper $D_8$ in duct 12 and introduced into the top of the other adsorption tower 5B. This desorption gas flows through adsorption tower 5B as a vertical, downward stream to heat the adsorbent packed in adsorption tower 5B and thereby desorb ammonia from the adsorbent. The desorption gas containing the desorbed ammonia is withdrawn from the bottom of adsorption tower 5B, conducted through exhaust gas duct 8B, duct 14 having the opened damper $D_9$, and duct 10, and then introduced into waste heat recovery boiler 2. Thus, the desorbed ammonia is recycled and utilized. As the aforesaid desorption gas, a portion of the exhaust gas from gas turbine 1 is used in a volume equal to about 1/50 of that of the main exhaust gas introduced into waste heat recovery boiler 2.

After ammonia has been fully desorbed from adsorption tower 5B in the above-described manner, dampers $D_{13}$ and $D_{15}$ are closed, dampers $D_{14}$ and $D_{10}$ are opened, and other dampers are suitably controlled. Then, cold gas is introduced into the bottom of adsorption tower 5B by way of duct 11, cooling gas duct 13, duct 17, and exhaust gas duct 8B. This cooling gas ascends through adsorption tower 5B to cool the adsorbent packed therein. Thereafter, the cooling gas is withdrawn from the top of adsorption tower 5B and conducted to stack 6 by way of exhaust gas duct 7B, duct 15 and duct 16.

As soon as the above-described adsorption in adsorption tower 5A and the above-described desorption, including cooling by cooling gas, in adsorption tower 5B are completed, the dampers are controlled in such a way that, conversely, the desorption step is performed in adsorption tower 5A, and the adsorption step is performed in adsorption tower 5B. Subsequently, adsorption and desorption steps are alternately repeated in each of adsorption towers 5A and 5B. In the above description of these steps, only the opening and closing of main dampers are explained. It is to be understood that other dampers are suitably controlled so as to allow the aforesaid steps to be performed.

Figures 2A, 2B, 2C:
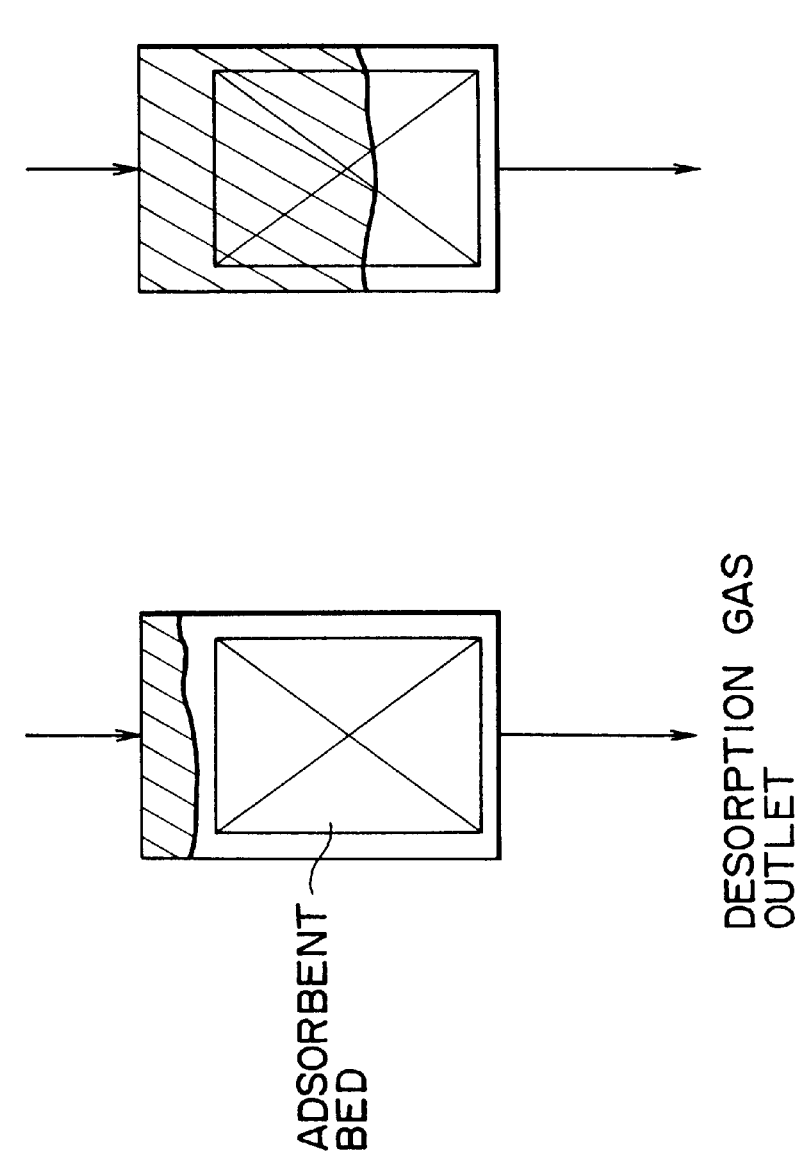
FIGS. 2(a), 2(b) and 2(c) are schematic views showing the flow of gas within an ammonia adsorption tower in accordance with the embodiment of FIG. 1.
Figure 4:
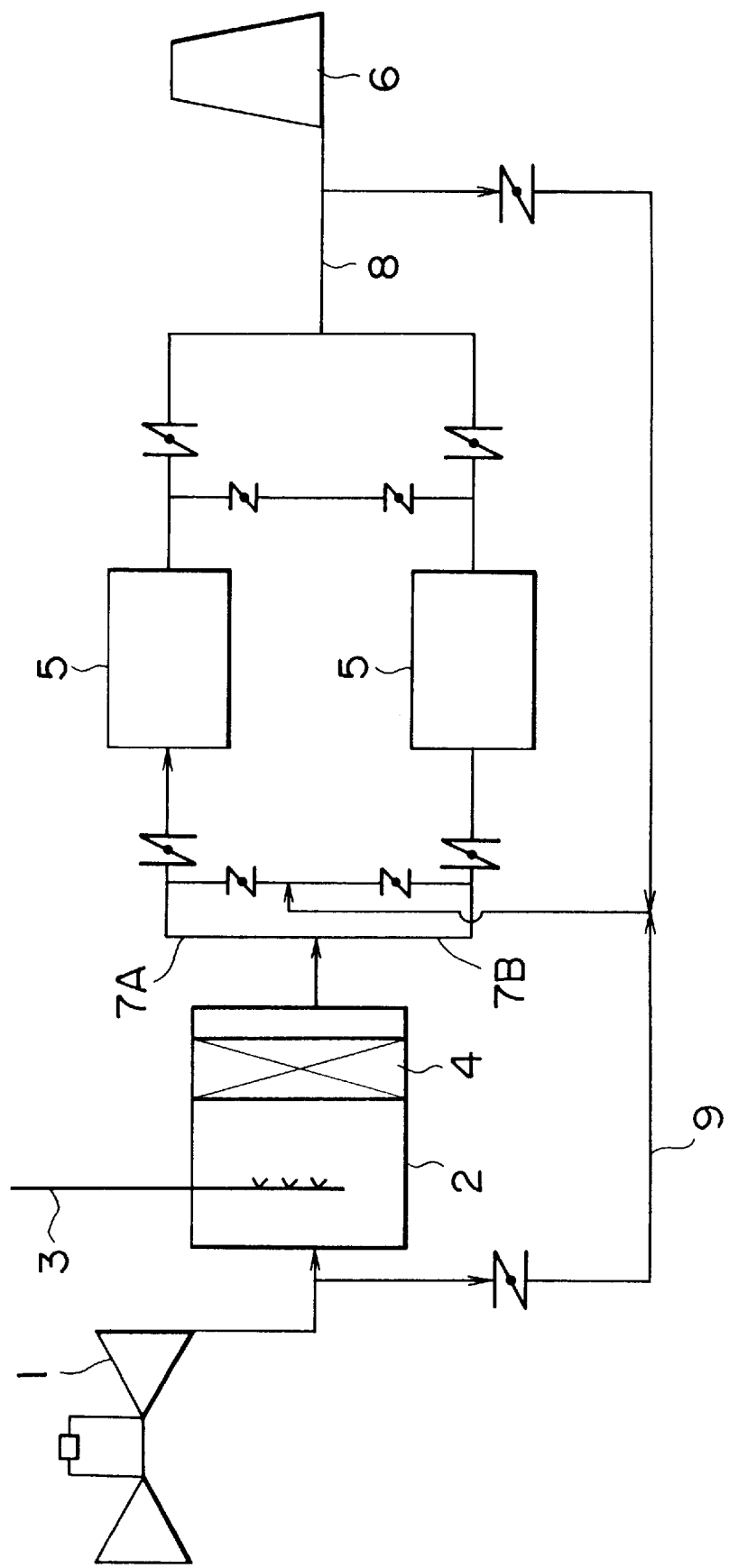
FIG. 4 is a flow diagram illustrating conventional ammonia adsorption apparatus.

The changes with time of the flow of desorption gas within a vertically disposed adsorption tower 5A or 5B are explained with reference to FIGS. 2(a), 2(b) and 2(c). A small volume of hot desorption gas is introduced into the top of adsorption tower 5A or 5B by way of desorption gas duct 9, duct 12 and exhaust gas duct 7A or 7B, and flows through adsorption tower 5A or 5B as a downward stream. Since the desorption gas is small in volume and has a low differential pressure, it does not pass directly to the bottom, but descends slowly through adsorption tower 5A or 5B while forming layered flow paths [FIG. 2(a) to FIG. 2(b)]. As a result, adsorption tower 5A or 5B is gradually and uniformly heated to the ammonia desorption temperature, whereupon the desorbed ammonia is discharged from the bottom by way of exhaust gas duct 8A or 8B, duct 14 and duct 10. Thus, by heating adsorption tower 5A or 5B uniformly with the aid of hot desorption gas flowing from the top toward the bottom thereof while forming layered flow paths, the temperature of adsorption tower 5A or 5B can be sufficiently raised using a small volume of desorption gas and the uniform desorption of ammonia can be achieved in a short period of time.

Changes in time of exhaust gas temperature at the top and bottom of an ammonia adsorption tower during its operation are explained with reference to FIG. 3. In this figure, there are shown two cases: (1) the case in which the cooling gas flows from the bottom to the top of the adsorption tower according to the above-described embodiment of the present invention (i.e., cooling gas ascending mode), and (2) the case in which the cooling gas flows reversely from the top to the bottom of the adsorption tower (i.e., cooling gas descending mode). In case (1), the full line and the broken line represent the top temperature of the adsorption tower and the bottom temperature of the adsorption tower, respectively. In case (2), the single and double dotted lines represent the top temperature of the adsorption tower and the bottom temperature of the adsorption tower, respectively. An adsorption step is commenced at the starting point of adsorption and completed after ammonia has been fully adsorbed. Then, a heating/desorption step is performed by introducing hot exhaust gas into the top of the adsorption tower in order to heat the adsorption tower. In this step, the temperature of the adsorption tower rises initially at the top thereof and later at the bottom thereof. After the desorption step is continued until the ammonia present in the adsorption tower is fully desorbed (i.e., until the ammonia concentration at the bottom is reduced to about 0 ppm), the adsorption tower is cooled in preparation for the next adsorption step. In the cooling gas ascending mode (1), the temperature of the adsorption tower begins to fall at the bottom thereof and all the steps are completed at the end point of this adsorption/desorption cycle, so that the next cycle can be commenced smoothly. In the cooling gas descending mode (2), the temperature of the adsorption tower begins to fall at the top thereof and causes the interior of the adsorption tower to be cooled gradually. However, an uneven temperature distribution is created within the adsorption tower because the cold cooling gas flows locally through paths having lower pressure losses. Accordingly, the time required to spread the cooling gas throughout the adsorption tower and cool it to a temperature suitable for the next adsorption step is about 1.5 times as long as that observed in the cooling gas ascending mode (1). As a result, the adsorption/desorption cycle time varies from cycle to cycle, and mode (2) is undesirable from a practical point of view.

Although exhaust gas from a gas turbine is used as desorption gas in the above-described embodiment, it is also possible to use any other hot gas.

We claim:

1. An ammonia adsorption apparatus for removing residual ammonia present in a treated denitrated gas discharged from a denitrator which decomposes nitrogen oxides present in exhaust gas from a turbine, using ammonia as a reducing agent, said apparatus comprising:

at least two vertical adsorption towers, each tower having an adsorbent bed provided therein for removing ammonia by adsorption, and each tower being adapted to receive treated ammonia-containing denitrated gas in an upper portion thereof;

wherein each said tower is adapted to receive a heated gas at the upper portion thereof during regeneration of each adsorption tower, and wherein the heated gas used to desorb said adsorbent flows from said upper portion to a lower portion of the adsorption tower, said towers being configured such that said heated gas forms layered flow paths when flowing from said upper portion to said lower portion of the adsorption tower; and wherein each tower is further adapted to receive cooling gas in a lower portion thereof at the end of said regeneration step, wherein said cooling gas flows from said lower portion to said upper portion of the adsorption tower.

2. An apparatus for removing nitrogen oxides from a gas turbine exhaust gas, said apparatus comprising:

a waste heat recovery boiler including an ammonia injector and positioned downstream from a gas turbine and adapted to receive exhaust gas from said gas turbine;

a denitrator which decomposes nitrogen oxides from the exhaust gas into innoxious nitrogen and water provided downstream from said boiler;

first and second vertical adsorption towers, each tower having an upper portion and a lower portion, said towers being adapted to receive ammonia-containing exhaust gas in an upper portion thereof and each tower further being adapted to receive heated gas in an upper portion thereof and cooling gas in a lower portion thereof, said lower portions of said towers being in fluid communication with said waste heat recovery boiler;

first and second exhaust gas ducts, one end of each duct being connected to said denitrator, and a second end of said first duct being connected to said upper portion of said first vertical adsorption tower and a second end of said second duct being connected to said upper portion of said second vertical adsorption tower;

a stack which is in fluid communication with said lower portions of said first and second adsorption towers; and at least one heated gas duct in the upper portion of each adsorption tower for introducing heated gas and at least one cooling gas duct in the lower portion of each adsorption tower for introducing cooling gas;

wherein, said apparatus is configured such that during regeneration of each adsorption tower, heated gas used for desorption flows from said heated gas duct in said upper portion to said lower portion of each adsorption tower and cooling gas flows from said cooling gas duct in said lower portion to said upper portion of each adsorption tower, said towers being configured such that said heated gas forms layered flow paths when flowing from said upper portion to said lower portion of the adsorption tower.

3. An apparatus as claimed in claim 2, further comprising at least one duct which connects said gas turbine with said stack.

4. An apparatus according to claim 2, wherein said stack is provided with a duct which permits a portion of gas passing therethrough to be diverted to said bottom portion of said towers during said regeneration.

5. An apparatus according to claim 2, further comprising a desorption gas duct which is positioned between said gas turbine and said waste heat recovery boiler, to permit a portion of said gas turbine exhaust gas to be diverted to said upper portion of said towers during said regeneration.

6. An apparatus according to claim 2, wherein said waste heat recovery boiler further comprises a heat exchanger.

7. A method for removing residual ammonia present in a denitrated gas, discharged from a denitrator which treats a mixture of ammonia and an exhaust gas from a turbine to produce a denitrated gas containing residual ammonia, wherein said method comprises:

an adsorption step comprising introducing denitrated gas containing residual ammonia into an upper portion of a first adsorption tower containing an adsorbent bed to adsorb said ammonia present in said denitrated gas, said denitrated gas being directed after a period of time to a second adsorption tower also containing an adsorbent bed to remove ammonia;

a regeneration step comprising introducing a heated gas at the upper portion of said first adsorption tower to desorb ammonia present its adsorbent bed, said heated gas forming layered flow paths when flowing from said upper portion to said lower portion of the first adsorption tower, and then cooling said first tower by introducing a cooling gas at a bottom portion thereof, while said adsorption step is effected in said second tower; and alternating said adsorption step and said regeneration step in said first and second adsorption towers.

8. A method according to claim 7, further comprising introducing ammonia desorbed in said regeneration steps in a waste heat recovery boiler provided upstream from said denitrator, whereby said desorbed ammonia is recycled to treat said denitrated gas.

\* \* \* \* \*